US012625469B2

(12) United States Patent
Hernandez

(10) Patent No.: US 12,625,469 B2
(45) Date of Patent: May 12, 2026

(54) FASTENING ELEMENT FOR TIMEPIECES

(71) Applicant: Nivarox-FAR S.A., Le Locle (CH)

(72) Inventor: Ivan Hernandez, Cressier (CH)

(73) Assignee: Nivarox-FAR S.A., Le Locle (CH)

( * ) Notice: Subject to any disclaimer, the term of this patent is extended or adjusted under 35 U.S.C. 154(b) by 294 days.

(21) Appl. No.: 18/498,211

(22) Filed: Oct. 31, 2023

(65) Prior Publication Data

US 2024/0176297 A1 May 30, 2024

(30) Foreign Application Priority Data

Nov. 25, 2022 (EP) .................................... 22209690

(51) Int. Cl.
*G04B 17/34* (2006.01)
*G04D 3/00* (2006.01)

(52) U.S. Cl.
CPC ........... *G04B 17/34* (2013.01); *G04D 3/0038* (2013.01)

(58) Field of Classification Search
CPC ................................ G04B 17/32; G04B 17/34
See application file for complete search history.

(56) References Cited

U.S. PATENT DOCUMENTS

| | | | | |
|---|---|---|---|---|
| 9,678,477 | B2 * | 6/2017 | Tanabe | G04B 13/02 |
| 10,365,608 | B2 * | 7/2019 | Mertenat | G04B 13/021 |
| 2008/0112274 | A1 | 5/2008 | Bitterli et al. | |
| 2009/0263182 | A1 * | 10/2009 | Bannier | G04B 35/00 29/893.2 |
| 2013/0047437 | A1 * | 2/2013 | Daout | G04B 17/345 403/345 |
| 2015/0023140 | A1 * | 1/2015 | Daout | G04B 1/145 368/177 |
| 2017/0261937 | A1 | 9/2017 | Merino | |
| 2018/0150029 | A1 * | 5/2018 | Shibuya | G04B 13/022 |

FOREIGN PATENT DOCUMENTS

| | | | |
|---|---|---|---|
| CH | 716 511 | A2 | 2/2021 |
| CN | 102566401 | A | 7/2012 |
| CN | 104024962 | A | 9/2014 |
| CN | 104133362 | A | 11/2014 |
| CN | 107450296 | A | 12/2017 |
| CN | 107957674 | A | 4/2018 |
| EP | 1 921 517 | A1 | 5/2008 |
| EP | 3 401 740 | A1 | 11/2018 |
| JP | 2008-122385 | A | 5/2008 |
| JP | 6345822 | B2 | 6/2018 |

(Continued)

OTHER PUBLICATIONS

Translation of CH716511 (Year: 2021).*

(Continued)

*Primary Examiner* — Edwin A. Leon
*Assistant Examiner* — Jason M Collins
(74) *Attorney, Agent, or Firm* — Oblon, McClelland, Maier & Neustadt, L.L.P.

(57) ABSTRACT

An elastic fastening element for holding a timepiece component on a support element, including an opening the contour of which includes at least four contact areas for receiving and clamping the support element in the opening, the contact areas each being included on an inner face of a deformable portion provided with a through-hole of the fastening element.

17 Claims, 4 Drawing Sheets

(56) References Cited

FOREIGN PATENT DOCUMENTS

| | | |
|---|---|---|
| JP | 2021-32878 A | 3/2021 |
| TW | 200819931 A | 5/2008 |

OTHER PUBLICATIONS

Japanese Office Action issued on Oct. 22, 2024 in Japanese Patent Application No. 2023-184144, 6 pages.
Combined Taiwanese Office Action and Search Report issued Aug. 12, 2024, in corresponding Taiwanese Patent Application No. 112140139 (with English Translation), 26 pages.
European Search Report issued Apr. 17, 2023 in European Application 22209690.1 filed on Nov. 25, 2022, 3 pages (with English Translation of Categories of Cited Documents).

* cited by examiner

FASTENING ELEMENT FOR TIMEPIECES

CROSS-REFERENCE TO RELATED APPLICATION

This application claims priority to European Patent Application No. 22209690.1 filed on Nov. 25, 2022, the entire disclosure of which is hereby incorporated herein by reference.

FIELD OF THE INVENTION

The present invention pertains to an elastic fastening element for timepieces, more particularly an element for holding a timepiece component on a fixed or mobile support element, such as a staff, by elastic clamping of the support element.

BACKGROUND OF THE INVENTION

Such elastic fastening elements are known in the prior art and may be for example in the form of a collet for fastening the inner end of a balance-spring to the staff of a balance, and a clamp for fastening the outer end of a balance-spring to a balance-spring stud.

These elastic fastening elements are very advantageous in that they make it possible to easily and height-adjustably mount the balance-spring on the balance staff and the balance-spring stud.

The present invention aims to further improve these elastic fastening elements by making them capable of exerting a greater clamping force and/or of further deforming.

SUMMARY OF THE INVENTION

The aim of the present invention is to overcome all or part of the aforementioned drawbacks by proposing an elastic fastening element that has a high holding torque particularly to facilitate/simplify the mounting operations of an assemblage of an elastic fastening element-timepiece component assembly with a support element as well as to ensure sufficient hold to guarantee that it is held in position in the plane and to guarantee its angular position during the life of the component.

To this end, the invention relates to an elastic fastening element for holding a timepiece component on a support element, comprising an opening the contour of which comprises at least four contact areas for receiving and clamping the support element in said opening, said contact areas each being included on an inner face of a deformable portion provided with a through-hole of the fastening element.

In other embodiments:

- the deformable portion consists of different regions that are configured to be deformed in different ways as soon as they are placed under constraint by the support element.
- the deformable portion consists of regions having a deformation coefficient the value of which reduces, as this region is moved away from the contact area included on the inner face of said deformable portion;
- the deformable portion comprises a receiving region, two connection regions and an outer region that together delimit the periphery of the through-hole of the deformable portion;
- the body of said element is rigid or essentially rigid with the exception of the deformable portions;
- each deformable portion is arranged in the body of said element at equal distance from each of the other deformable portions that are arranged in its direct vicinity in said body;
- each deformable portion is configured to vary a volume defined in its through-hole when this portion is placed under constraint by the support element;
- the through-hole of each deformable portion represents between 20 and 80 percent of the portion of the body of the element constituting said portion;
- the elastic fastening element comprises a point of attachment with the timepiece component;
- the elastic fastening element is a collet for fastening the timepiece component such as a balance-spring to a support element such as a balance shaft;
- the elastic fastening element is made of a silicon or silicon-based material.

The invention also relates to an elastic fastening element-timepiece component assembly for a horological movement of a timepiece comprising such a fastening element.

Advantageously this assembly is made in one piece.

The invention also relates to an assemblage for a horological movement of a timepiece comprising such an elastic fastening element-timepiece component assembly, said assembly being fastened to a support element.

The invention also relates to a horological movement comprising at least one such assemblage.

The invention also relates to a timepiece comprising such a horological movement.

The invention also relates to a method for performing such an assemblage of an elastic fastening element-timepiece component assembly with a support element, comprising:

- a step of inserting the support element into an opening of the elastic fastening element of said assembly, said step comprising a sub-step of elastically deforming the elastic fastening element provided with a phase for deforming the deformable portions of the elastic fastening element inducing a radial displacement of each deformable portion in relation to an axis of revolution of the elastic fastening element, and
- a step of fastening the fastening element on the support element comprising a sub-step of performing a radial elastic clamping of the fastening element on the support element.

BRIEF DESCRIPTION OF THE DRAWINGS

Other specific features and advantages will become clearly apparent from the description which is given below, by way of indicative and non-limiting example, with reference to the appended drawings, wherein.

DETAILED DESCRIPTION OF PREFERRED EMBODIMENTS

Figure 1:
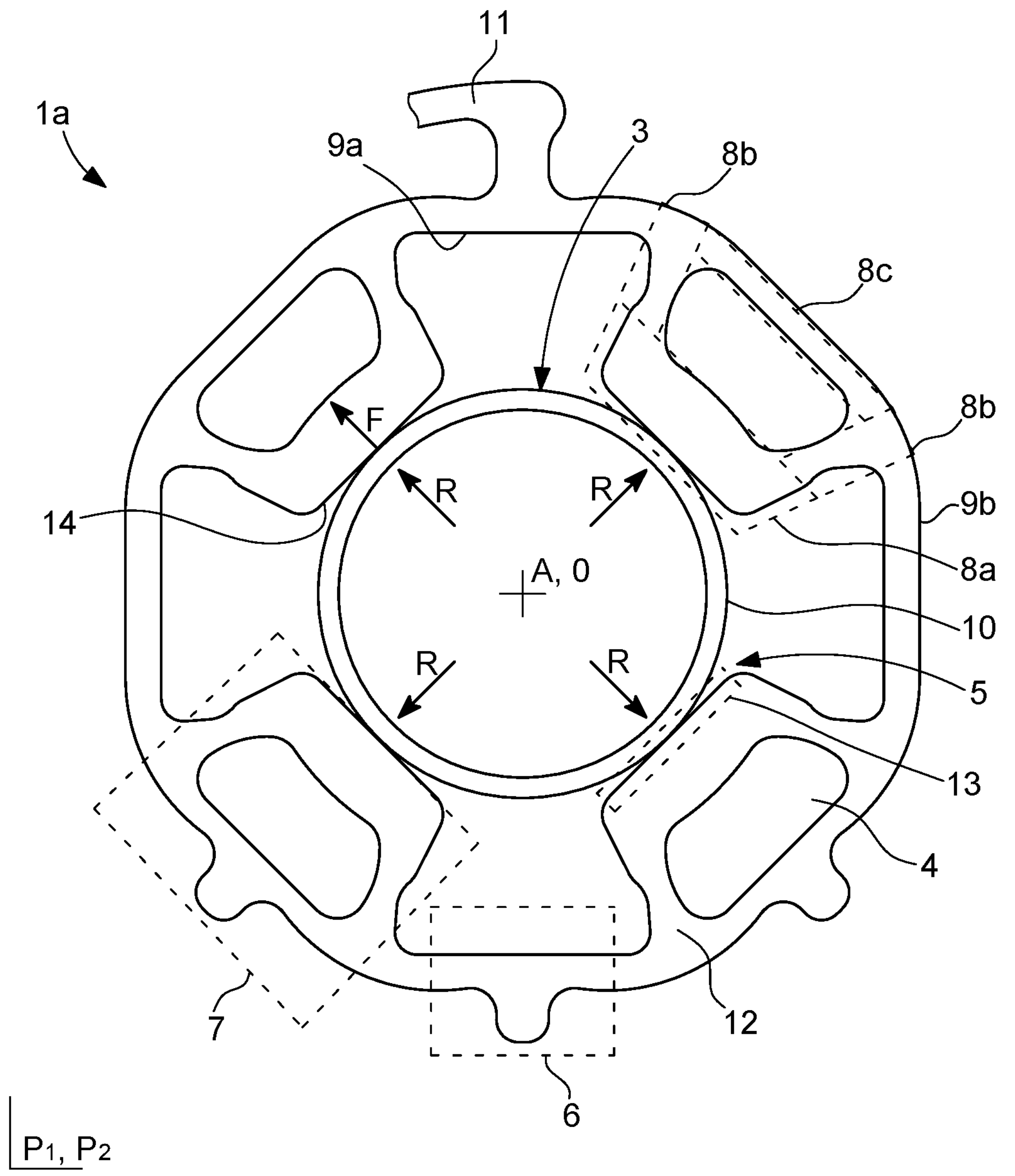
FIG. 1 is a view of an elastic fastening element for fastening a timepiece component on a support element, said fastening element comprising four contact areas for receiving and clamping the support element in an opening of said fastening element, according to a first embodiment of the invention.
Figure 2:
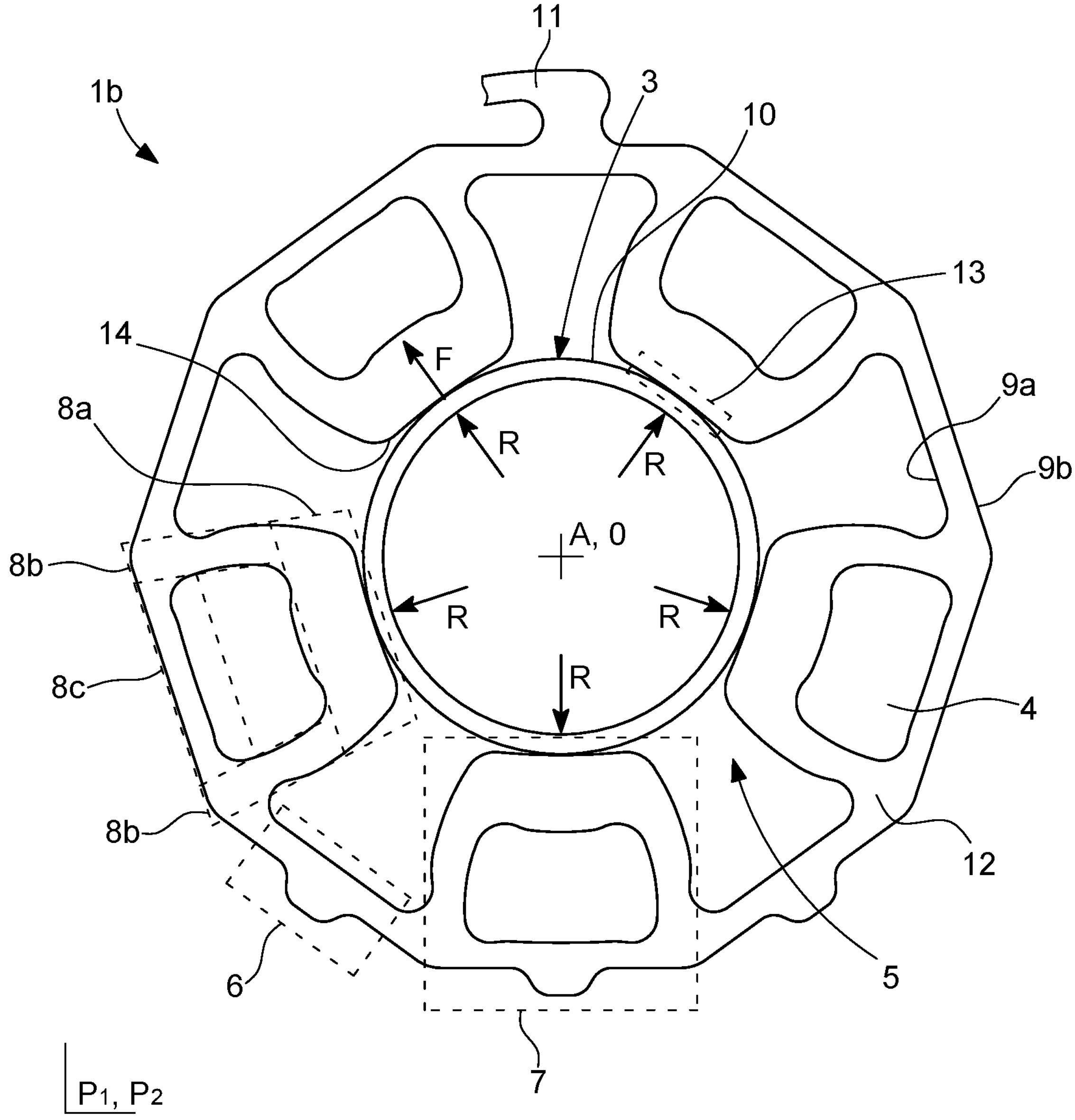
FIG. 2 is a view of an elastic fastening element for fastening a timepiece component on a support element, said fastening element comprising five contact areas for receiving and clamping the support element in an opening of said fastening element, according to a second embodiment of the invention.
Figure 3:
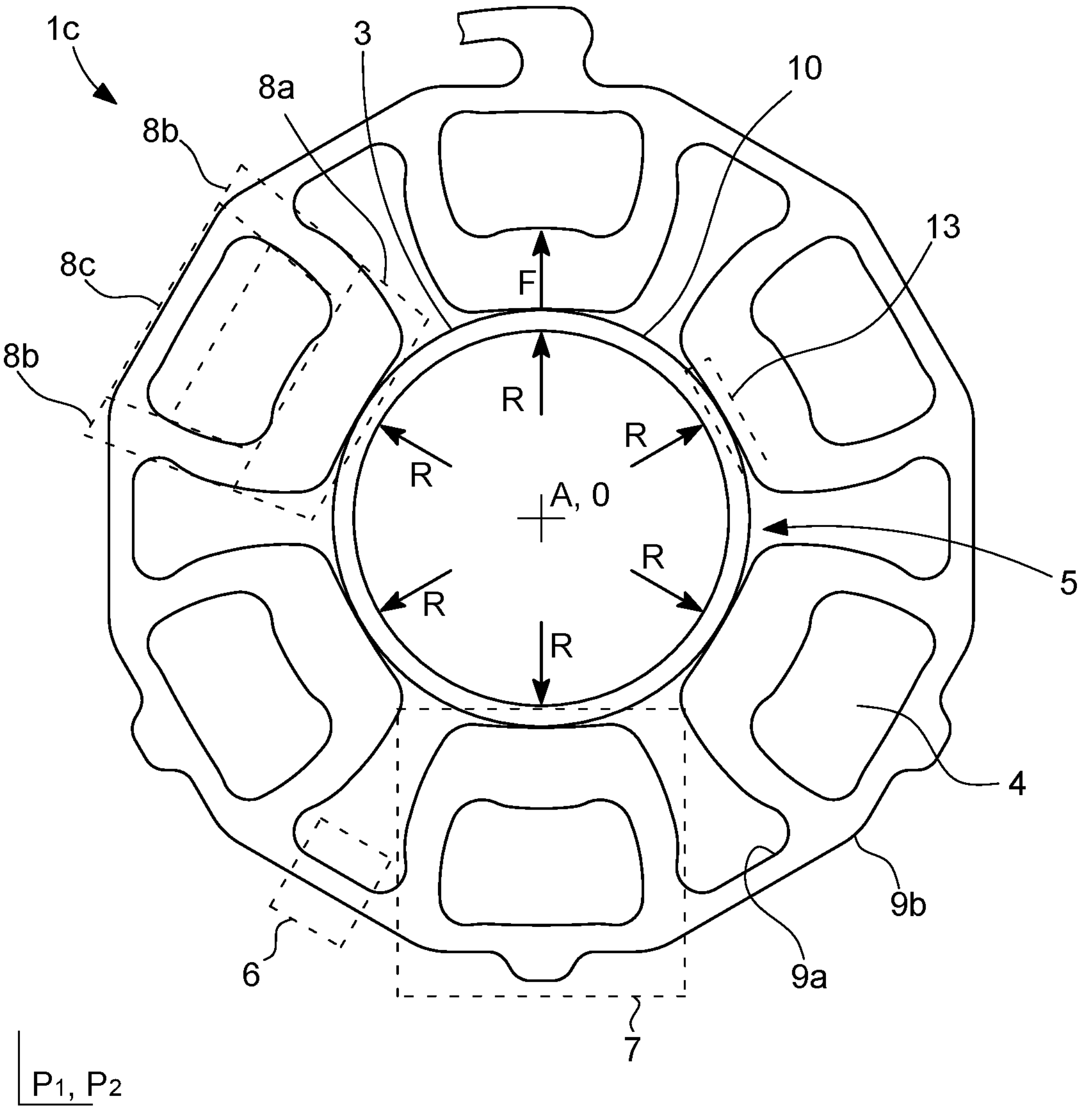
FIG. 3 is a view of an elastic fastening element for fastening a timepiece component on a support element, said fastening element comprising six contact areas for receiving and clamping the support element in an opening of said fastening element, according to a third embodiment of the invention.

FIGS. 1 to 3 show three embodiments of the elastic fastening element 1*a*, 1*b*, 1*c* for fastening a timepiece component 2 on a support element 3. In these various embodiments, the elastic fastening element 1*a*, 1*b*, 1*c* may comprise four, five or six contact areas 13 for receiving and clamping the support element in an opening 5 of said fastening element 1*a*, 1*b*, 1*c*. By way of example, the elastic fastening element 1*a*, 1*b*, 1*c* may be a collet for fastening the timepiece component 2 such as a balance-spring to a support element 3 such as a balance shaft.

Figure 4:
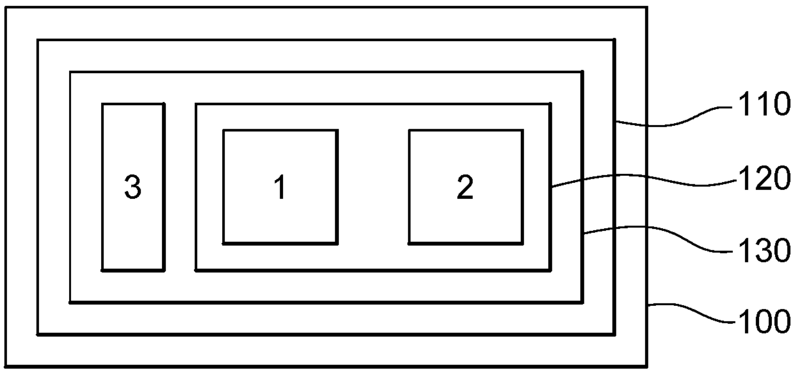
FIG. 4 represents a timepiece comprising a horological movement provided with at least one assemblage including an elastic fastening element-timepiece component assembly fastened to a support element, according to the embodiments of the invention.

In these embodiments, this fastening element 1*a*, 1*b*, 1*c* may be included in an elastic fastening element-timepiece component assembly 120 that can be seen in FIG. 4 and that is provided to be arranged in a horological movement 110 of a timepiece 100. Such an assembly 120 may be a single piece made of a so-called “fragile” material, preferably a micro-machinable material. Such a material may comprise silicon, quartz, corundum or also ceramic.

In the context of the invention, this fastening element 1*a*, 1*b*, 1*c* has a thickness between 50 and 150 μm. Such a thickness is preferably in the order of 100 μm.

It will be noted that in a variant of this assembly 120, only the elastic fastening element 1*a*, 1*b*, 1*c* may be made of such a so-called “fragile” material, the timepiece component 2 then being manufactured in another material.

This assembly 120 may form part of an assemblage 130 for the horological movement 110, by being fastened to the support element 3 for example by elastic clamping. It will be noted that this assemblage 130 was designed for applications in the watchmaking field. However, the invention may be implemented perfectly in other fields such as aeronautics, jewellery, or also automotive.

Such a fastening element 1*a*, 1*b*, 1*c* comprises an opening 5 also called “central opening” wherein the support element 3 is intended to be inserted. This opening 5 defines a volume in the fastening element 1*a*, 1*b*, 1*c* that is smaller than that of a connecting portion of an end of the support element 3 that is provided to be arranged therein. It will be noted that this connecting portion has a circular cross section and comprises all or part of the contact portions defined on a peripheral wall of the support element 3.

Such an element 1*a*, 1*b*, 1*c* also comprises an upper face and a lower face 12 preferably flat respectively included in first and second planes P1 and P2 that can be seen in FIGS. 1, 2 and 3 that are parallel with one another.

This element 1*a*, 1*b*, 1*c* also comprises inner and outer peripheral walls 9*a*, 9*b* that connect the upper and lower faces 12 to one another. The outer peripheral wall 9*b* comprises a surface that externally delimits the contour of the fastening element 1*a*, 1*b*, 1*c*. This peripheral wall 9*b* gives this element 1*a*, 1*b*, 1*c* an essentially polygonal shape of the type octagonal in FIG. 1, decagonal in FIG. 2 and dodecagonal in FIG. 3. As regards the inner peripheral wall 9*a*, it comprises a surface that delimits the contour of an opening 5 of this fastening element 1*a*, 1*b*, 1*c*. As we will see in the following, this inner peripheral wall 9*a* comprises contact areas 13 intended to bear against the support element 3. It will be noted that the transverse dimension of the outer peripheral wall 9*b* or of the inner peripheral wall 9*a* which is parallel to an axis of revolution A of the fastening element 1*a*, 1*b*, 1*c* here corresponds to the thickness of this element 1*a*, 1*b*, 1*c*.

This fastening element 1*a*, 1*b*, 1*c* comprises a body provided with at least four deformable portions 7 also called “flexible portions” or also “elastic portions”. Each deformable portion 7 is configured to return to its original shape after having been deformed. In other words, these portions are reversibly deformable portions 7. The body of this element 1*a*, 1*b*, 1*c* is rigid or essentially rigid, with the exception of the deformable portions 7 that it includes. In other words, this body comprises deformable portions 7 and rigid portions 6. Rigid portions 6 means portions 6 that withstand pressure or deformation, namely non-deformable portions. In the elastic fastening element 1*a*, 1*b*, 1*c*, the rigid portions 6 are configured to be essentially subjected to tensile stress. In this configuration, these rigid portions 6 withstand pressure or tensile deformation.

It is therefore understood that in the body of this element 1, the deformable portions 7 are separated from one another by the rigid portions 6. It can also be said that these deformable portions 7 are connected to one another by these rigid portions 6. It will be noted that each deformable portion 7 is arranged in the body of said element 1*a*, 1*b*, 1*c* at equal distance from each of the other deformable portions 7 that are arranged in its direct vicinity, or closest vicinity, in said body.

In this configuration, each deformable portion 7 extends between the inner and outer peripheral walls 9*a*, 9*b* of the body of the element 1*a*, 1*b*, 1*c*. It will be noted that such deformable portions 7 are similar to one another. In this element 1, these portions 7 form an excrescence in the inner peripheral wall 9*a* of the body of the element 1*a*, 1*b*, 1*c* that extends in the direction of the centre O of the fastening element 1*a*, 1*b*, 1*c*.

Each deformable portion 7 comprises a receiving region 8*a*, two connection regions 8*b* and an outer region 8*c*. These regions 8*a*, 8*b*, 8*c* together delimit the periphery of a through-hole 4 of this portion 7.

In this configuration, the receiving region 8*a* is included between the inner peripheral wall 9*a* of the element 1*a*, 1*b*, 1*c* and a portion of the periphery of the through-hole 4 by being connected to the two connection regions 8*b* of this deformable portion 7. This receiving region 8*a* is provided with an inner face 14 comprising the contact area 13 of each deformable portion 7. This inner face 14 is formed by a portion of the inner peripheral wall 9*a* that is included in this portion 7. In other words, this inner face 8 is included at the end of the excrescence forming this deformable portion 7 facing the centre O of the fastening element 1. In this configuration, the contact area 13 may have:

- a rounded or convex surface by being arranged between two hollow or concave portions of the inner face 14, or
- a flat or essentially flat surface.

This contact area 13 comprises a substantially hollow or substantially concave portion wherein two bearing areas are included. These two bearing areas are able to cooperate with the corresponding convex contact portion of the support element 3. Such bearing areas are defined/included in the surface of this contact area 13 by extending substantially over all or part of the thickness of the attachment part 1. In addition, these bearing areas are flat by each comprising a surface that is entirely or partly flat. In the contact area 13, the two bearing areas are respectively included in different planes together forming an obtuse angle. These two bearing areas are disjoint by being spaced apart from one another. In other words, the contact area 13 comprises an area for connecting the two bearing areas. This connection area preferably has a rounded shape.

These bearing areas are provided particularly to cooperate with the contact portions according to a contact configuration of piano-convex or also piano-cylindrical type if the cylindrical shape of the support element 3 is taken into account. In this configuration, the flat surface of each bearing area cooperates with the corresponding contact portion of convex shape of the support element 3. Here, it is specified that this convex shape of each contact portion is assessed relative to the flat surface of each corresponding bearing area opposite to which this portion is arranged. It will be noted that this flat surface of each bearing area forms a plane tangent to the diameter of the support element 3. In other words, the flat surface is perpendicular to the diameter and therefore to the radius of the support element.

In this configuration, the presence of two flat bearing areas in each contact area 13 of the attachment part 1 makes it possible to carry out a contact pressure between this attachment part 1 and the support element 3 during the production of a mechanical connection between them and this, while substantially reducing the intensity of the stresses at these bearing areas and the corresponding contact portions of the support element 3 during the assemblage and/or fastening of this attachment part 1 with the support element 3, which stresses being likely to damage the attachment part 1 by the appearance of fractures/breaks or also cracks.

In this element 1, the presence of this contact area 13 in the inner face 8 of each deformable portion 7 makes it possible to carry out a contact pressure between this element 1*a*, 1*b*, 1*c* and the support element 3 during the production of a mechanical connection between them and this, while substantially reducing the intensity of the stresses at this contact area 13 and the corresponding contact region of the support element 3 during the assemblage and/or fastening of this element 1*a*, 1*b*, 1*c* with the support element 3, which stresses being likely to damage said element 1*a*, 1*b*, 1*c* by the appearance of fractures/breaks or also cracks.

As we have already seen, these deformable portions 7 therefore comprise the only contact areas 13 of the element 1*a*, 1*b*, 1*c* with the support element 3 that may be defined in all or part of the inner faces 8 of these portions 7. With reference to FIGS. 1, 2 and 3, these contact areas 13 are at least four in number and may participate in performing an accurate centring of the timepiece component 2, for example a balance-spring, in the horological movement 110.

In each deformable portion 7, the outer region 8*c* is included between the outer peripheral wall 9*b* of the element 1*a*, 1*b*, 1*c* and a portion of the periphery of the through-hole 4 by also being connected to two connection regions 8*b*. As regards these two connection regions 8*b*, they are each included between an end of a rigid portion 6, a portion of the outer peripheral wall 9*b* and a portion of the periphery of the through-hole. It will be noted that these two connection regions also connect the receiving 8*a* and outer 8*c* regions to one another.

In the element 1, the deformable portion 7 comprises the through-hole 4, also called recess, and which is defined in the thickness of this element 1*a*, 1*b*, 1*c*. This through-hole 4 opens both onto the upper and lower faces 10 of the element 1*a*, 1*b*, 1*c*. It can also be said that this through-hole 4 opens onto an end in the upper face of the deformable portion 7 and onto another end in the lower face 10 of this portion 7. This hole 4 extends in a direction of the axis of revolution A and this, from the upper face to the lower face 10 or vice versa. In other words, this hole 4 connects these two faces 10 to one another. This through-hole 4 defines a void volume or also a void volume of material or of no material. It is therefore understood that this volume corresponds to a variable or configurable volume. This volume comprises an open enclosure delimited by a peripheral wall of this hole 4. Such a through-hole 4 represents approximately between 20 and 80 percent of the body of the deformable portion 7. Preferably, this through-hole 4 represents 30 percent of this body.

In these conditions, it will be noted that each deformable portion 7 is configured to modify the volume defined by this through-hole 4 when this portion 7 is placed under constraint by the support element 3.

In this element 1*a*, 1*b*, 1*c*, the rigid portions 6 extend between the inner and outer peripheral walls 9*a*, 9*b* of the body of the element 1*a*, 1*b*, 1*c*. These rigid portions 6 preferably have an elongated shape. Indeed, each rigid portion extends longitudinally between two deformable portions 7 to which it is connected. It is therefore understood that each rigid portion 6 is directly connected at each of its two ends opposite two deformable portions 7. Additionally, it will be noted that the deformable 7 and rigid portions 6 are arranged successively and alternating in the fastening element 1*a*, 1*b*, 1*c*. Each rigid portion 6 is connected to two different deformable portions 7, which deformable portions 7 are "directly" connected to the other rigid portions 6 of the element 1*a*, 1*b*, 1*c*. It will be noted that the rigid portions 6 here are non-deformable or almost non-deformable and act as elements for stiffening the fastening element 1*a*, 1*b*, 1*c*.

Moreover, in each deformable portion 7, the receiving region 8*a*, the two connection regions 8*b* and the outer region 8*c* mark/surround/delimit the through-hole 4. More precisely, these regions 8*a* to 8*c* are configured to be deformed in different ways as soon as they are constrained by the insertion of the support element 3 into the opening 5 of the element 1*a*, 1*b*, 1*c*. Indeed, for each deformable portion 7 each of these regions 8*a* to 8*c* has a deformation coefficient $C_{rr}$, $C_{rl}$, $C_{re}$ the value of which reduces, as this region 8*a*, 8*b*, 8*c* is moved away from the contact area 13 of the receiving region 8*a*. In other words, the deformation coefficient $C_{rr}$, also called average deformation coefficient $C_{rr}$ of the receiving region 8*a* has a high value or higher than the value of the coefficient $C_{rl}$ of two connection regions 8*b* and of that of the coefficient $C_{re}$ of the outer region 8*c*. In addition, the coefficients $C_{rl}$ of the two connection regions 8*b* have similar or substantially similar values that are higher than that of the coefficient $C_{re}$ of the outer region 8*c*. In other words, the relation between these average deformation coefficients $C_{rr}$, $C_{rl}$, and $C_{re}$ of these regions 8*a*, 8*b*, 8*c* may be defined according to the following mathematical formula:

$$C_{rr}>C_{rl}>C_{re}$$

It will be noted that the deformations of these regions 8*a*, 8*b*, 8*c* generate a radial displacement relative to the axis of revolution A, of each one of them. The significance/intensity of these radial displacements are of course a function of the average deformation coefficients $C_{rr}$, $C_{rl}$, $C_{re}$ of these regions 8*a*, 8*b*, 8*c*.

In this fastening element 1, these rigid and deformable portions 6, 7 essentially make it possible to perform a fastening of the elastic clamping type of the support element 3 in the opening 5 made in this fastening element 1*a*, 1*b*, 1*c* which is defined by the inner peripheral wall 9*a* of this fastening element 1*a*, 1*b*, 1*c*.

As we have already seen, these deformable portions 7 comprise the only contact areas 13 of the fastening element 1*a*, 1*b*, 1*c* with the support element 3 that may be defined in all or part of the inner faces 14 of these deformable portions 7. The contact area 13 of each deformable portion 7 is provided to cooperate with a peripheral wall 10 of the connecting portion of the support element 3 in particular with the corresponding contact region defined in this peripheral wall 10 of the support element 3. In this context, the fastening element 1*a*, 1*b*, 1*c* then comprises at least four contact areas 13 that participate in performing an accurate centring of the timepiece component 2, for example a balance-spring, in the horological movement 110.

In this configuration, the elasticity or the flexibility of the element 1, is defined relative to the contact areas 13 of this element 1*a*, 1*b*, 1*c* more specifically relative to the intensity of the deformation of the deformable portions 7 during the application of a force on these contact areas 13.

Moreover, in this fastening element 1*a*, 1*b*, 1*c*, the rigid 6 and deformable portions 7 make it possible for the fastening element 1*a*, 1*b*, 1*c* to store a larger amount of elastic energy for the same clamping in comparison with the fastening elements of the prior art. It will be noted that this large storage of energy is particularly related to the volume of material constituting this fastening element 1*a*, 1*b*, 1*c* provided with through-holes 4 and rigid portions 6 subjected to tensile stress. Such an amount of elastic energy stored in the fastening element 1*a*, 1*b*, 1*c* then makes it possible to obtain a higher holding torque of the fastening element on the support element 3 in the assemblage 130 of the fastening element-timepiece component assembly 120 with this support element 3. Additionally, it will be noted that such a configuration of the fastening element 1*a*, 1*b*, 1*c* makes it possible to store elastic energy ratios that are 6 to 8 times greater than those of the fastening elements of the prior art.

It will be noted that the arrangement of the rigid and deformable portions 6, 7 in the fastening element 1*a*, 1*b*, 1*c* makes it possible, during an insertion with clamping, to deform each deformable portion 7 making it possible to accommodate the deformation of the whole fastening element 1*a*, 1*b*, 1*c* with the geometry of the connecting portion of the support element 3 on which it is assembled.

In addition, it will be noted that the through-hole 4 of the fastening element 1*a*, 1*b*, 1*c* is configured in order to contribute to controlling the displacement of the deformable portions 7, particularly to reduce this displacement, in such a way that the deformable portions 7 combined with the rigid portions 6 may store a maximum of elastic energy during the driving of the element 1*a*, 1*b*, 1*c* on the support element 3 and thus increase the holding of this element 1*a*, 1*b*, 1*c* on this element 3.

It will be noted that the elastic fastening element 1*a*, 1*b*, 1*c* by being provided with at least four contact areas 13, applies a contact pressure that is significantly reduced on the peripheral wall 10 of the support element 3 thus contributing to reducing the sensitivity of this element 1*a*, 1*b*, 1*c* to fracture and to chips.

Figure 5:
FIG. 5 represents a method for performing such an assemblage of an elastic fastening element-timepiece component assembly with a support element.

With reference to FIG. 5, the invention also relates to a method for performing the assemblage 130 of the elastic fastening element-horological component assembly 120 with the support element 3. This method comprises a step of inserting 20 the support element 3 into the opening 5 of the fastening element 1*a*, 1*b*, 1*c*. During this step 20, the end of the support element is presented at the entrance of the opening 5 defined in the lower face 12 of the fastening element 1*a*, 1*b*, 1*c* in anticipation of introducing the connecting portion of this support element 3 into the volume defined in this opening 5. This step 20 comprises a sub-step of elastically deforming 21 the fastening element 1*a*, 1*b*, 1*c* particularly a central area of this fastening element 1*a*, 1*b*, 1*c* comprising said opening 5 resulting from the application of a contact force F on the contact areas 13 of the deformable portions 7 by the contact portions of the peripheral wall 10 of the connecting portion of the support element 3. This elastic deformation of the central area therefore generates a deformation of the various regions 8*a*, 8*b*, 8*c* of each deformable portion 7 comprising the contact area 13.

This deformation sub-step 21 of the method, comprises a phase of displacing 22 the deformable portions 7 under the action of the contact force F that is applied to them. Such a displacement of these deformable portions 7 is performed in a radial direction R in relation to the axis of revolution A common to the support element 3 and to the fastening element 1. The contact force F is preferably perpendicular or substantially perpendicular to said contact area 13. During the course of this phase 23, the rigid portions 6 do not deform.

This method subsequently comprises a step of fastening 23 the fastening element 1*a*, 1*b*, 1*c* on the support element 3. Such a fastening step 23 particularly by radial elastic clamping, comprises a sub-step of performing 24 a radial elastic clamping of the fastening element 1*a*, 1*b*, 1*c* on the support element 3. It is therefore understood that in such a state of constraint, the fastening element 1*a*, 1*b*, 1*c* stores a large amount of elastic energy that contributes to giving it a substantial holding torque particularly allowing an optimal twist by elastic clamping.

The invention claimed is:

1. An elastic fastening element for holding a timepiece component on a support element, comprising:

a body formed by rigid portions and deformation portions, the rigid portions and the deformation portions being alternatively connected to form an outer perimeter of the body, an opening formed within the body, a contour of the opening comprising at least four contact areas for receiving and clamping the support element in said opening, said contact areas each being included on an inner face of each deformable portion provided with a through-hole of the fastening element.

2. The elastic fastening element according to claim 1, wherein the deformable portion includes different regions each having a different deformation coefficient such that the different regions configured to be deformed in different ways under constraint by the support element.

3. The elastic fastening element according to claim 1, wherein the deformable portion comprises a receiving region, two connection regions and an outer region that together delimit a periphery of the through-hole of the deformable portion.

4. The elastic fastening element according to claim 3, wherein a deformation coefficient of the receiving region is higher than a deformation coefficient of the two connection regions, and the deformation coefficient of the two connection regions is higher than a deformation coefficient of the outer region.

5. The elastic fastening element according to claim 1, wherein the body of said elastic fastening element is rigid or essentially rigid with the exception of the deformable portions.

6. The elastic fastening element according to claim 1, wherein each deformable portion is arranged in the body of said elastic fastening element at equal distance from each of the other deformable portions that are arranged in its direct vicinity in said body.

7. The elastic fastening element according to claim 1, wherein each deformable portion is configured to vary a volume defined in its through-hole when said portion is placed under constraint by the support element.

8. The elastic fastening element according to claim 1, wherein the through-hole of each deformable portion represents between 20 and 80 percent of said deformable portion.

9. The elastic fastening element according to claim 1, further comprising a point of attachment with the timepiece component.

10. The elastic fastening element according to claim 1, wherein said elastic fastening element is a collet for fastening the timepiece component to a support element.

11. The elastic fastening element according to claim 1, wherein said elastic fastening element is made of a silicon or silicon-based material.

12. An elastic fastening element-timepiece component assembly for a horological movement of a timepiece comprising a fastening element according to claim 1.

13. An assembly according to claim 12, wherein said assembly is made in one piece.

14. An assemblage for a horological movement of a timepiece comprising an elastic fastening element-timepiece component assembly according claim 12, said assembly being fastened to a support element.

15. A horological movement comprising at least one assemblage according to claim 14.

16. A timepiece comprising a horological movement according to claim 15.

17. A method for performing an assemblage of an elastic fastening element-timepiece component assembly with a support element according to claim 16, comprising:

a step of inserting the support element into an opening of the elastic fastening element of said assembly, said step comprising a sub-step of elastically deforming the elastic fastening element provided with a phase for deforming the deformable portions of the elastic fastening element inducing a radial displacement of each deformable portion in relation to an axis of revolution of the elastic fastening element, and a step of fastening the fastening element on the support element comprising a sub-step of performing a radial elastic clamping of the fastening element on the support element.

* * * * *